United States Patent Office 3,108,876
Patented Oct. 29, 1963

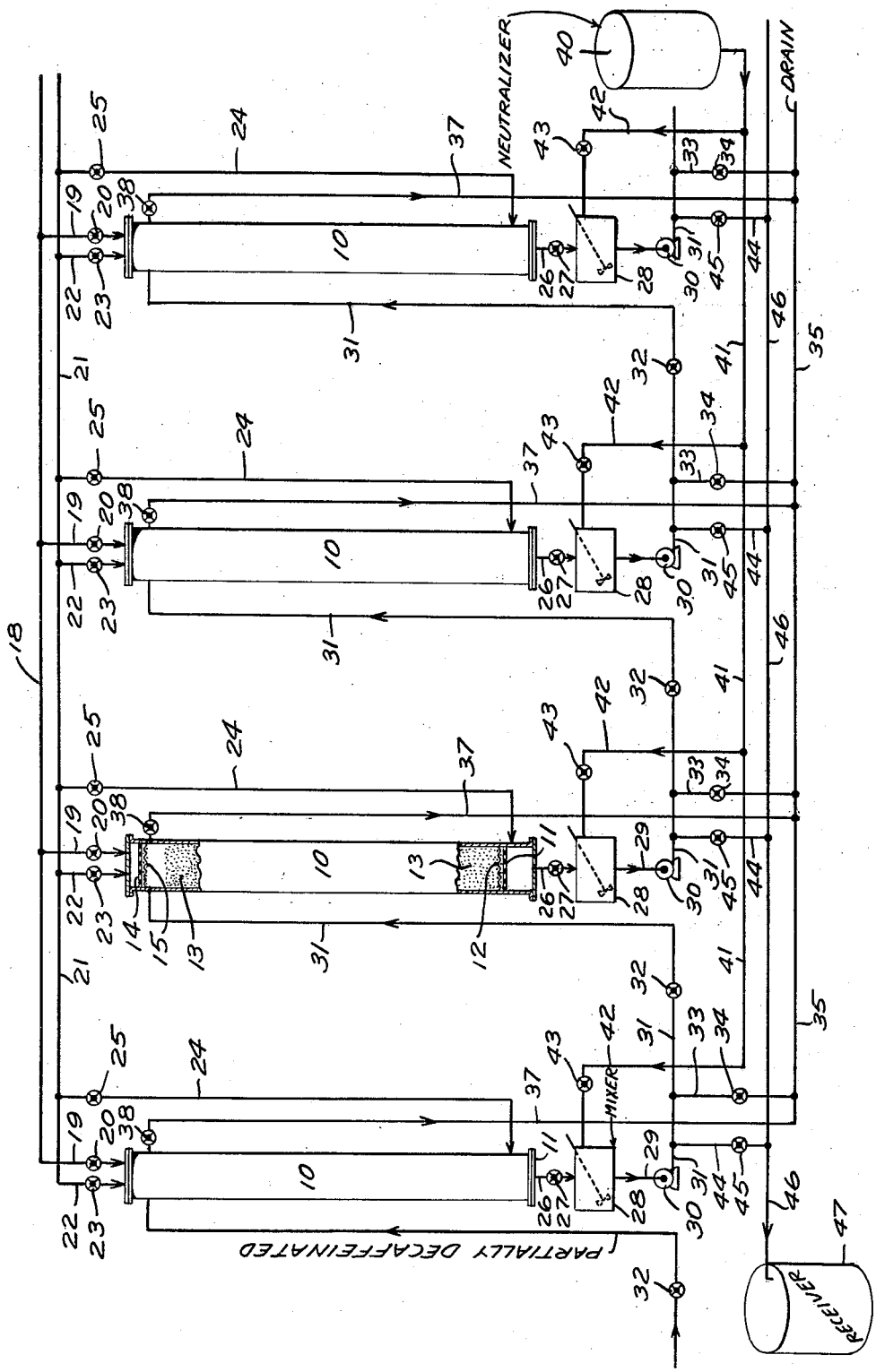

3,108,876
MANUFACTURE OF DECAFFEINATED
INSTANT COFFEE
Harry H. Turken, Belleville, and Thomas P. Daly, Far Hills, N.J., assignors, by mesne assignments, to Duncan Coffee Company, Houston, Tex., a corporation of Texas
Filed May 9, 1961, Ser. No. 108,953
5 Claims. (Cl. 99—69)

This invention relates to the decaffeination of instant coffee and has for an object to provide a process of the above type having novel and improved characteristics and which is suited for commercial operation.

Another object is to provide a novel and improved process of the above type wherein the off-taste which is common in decaffeinated coffee is eliminated.

Another object is to provide a decaffeinated instant coffee wherein the caffeine removal approaches 100 percent.

Various other objects and advantages will be apparent as the nature of the invention is more fully disclosed.

In accordance with the present invention the caffeine is removed from the coffee while in the form of a concentrated coffee extract by passing the extract through one or more beds of an ion exchange resin which is capable of preferentially removing caffeine from the extract. It has been found that the removal of the caffeine in this manner can be efficiently carried out to a high degree of decaffeination, approaching 100 percent. However, the action of the ion exchange resin reduces the pH value of the extract to a point such that an off-taste and precipitate is produced if the extract is allowed to stand for an appreciable length of time at this low pH value. The precipitate can be redissolved only with difficulty and the off-taste can not be overcome after it has once been allowed to develop.

It has been found that this off-taste and precipitate can be eliminated by immediately treating the decaffeinated extract with a neutralizing agent under conditions to restore the pH to its original value of about 5.0 to 5.2. This may be effected by adding the proper amount of a neutralizing agent such as sodium or potassium hydroxide, or carbonate, or phosphate, preferably potassium hydroxide since potassium is a natural ingredient of coffee.

After the decaffeination and neutralizing steps the extract is spray dried in the usual manner to form instant coffee powder. In such a product the caffeine content may be reduced to a value of the order of 0.1 to 0.01 percent.

When the caffeine content of the ion exchange resin bed has risen to a point such that it is incapable of further efficient decaffeination the bed is taken out of the decaffeination cycle and is regenerated by first passing rinse water through the bed, followed by an acid wash with an acid which is capable of removing the caffeine from the resin, for example a dilute sulfuric acid, followed by a further rinse with water, preferably in the reverse direction. The reactivated bed is then ready to be placed in the decaffeination cycle for the treatment of further quantities of extract. By using a plurality of resin beds in sequence a continuous commercial operation is obtained.

The nature of the invention will be better understood from the following detailed description, taken in connection with the accompanying drawing in which a specific embodiment has been set forth for purposes of illustration.

In the drawing:

The FIGURE is a schematic diagram of a representative apparatus for carrying out the invention.

Referring to the drawing more in detail the decaffeination apparatus is shown as comprising a plurality of towers 10. Four such towers have been shown but the number of towers may be increased as desired depending upon the size of the towers and the desired capacity of the apparatus. Each tower 10 is provided with a lower transverse pervious wall 11 having a covering 12 of a fabric or screen having a fine mesh, such as a nylon cloth, which is adapted to support a bed 13 of finely divided ion exchange resin. A similar partition 14 with a fine mesh fabric 15 is disposed at the upper portion of the tower 10 above the top of the bed 13 to confine the resin but to provide clearance for the expansion of the bed in response to reverse flow of rinse water or the like during the regeneration cycle.

The ion exchange resins are of the cation exchange type used in the hydrogen cycle. Amberlite IR–120, a polystyrene sulfonic acid resin, has been found to be particularly suitable. However, other resins may be used such as carboxylic acid resins and polystyrene quaternary amine resins.

A header 18 adapted to carry the coffee concentrate extends past all of the towers 10. This header 18 is connected by pipes 19 having valves 20 therein to the top portion of each tower 10 above the top of the bed 13 for the supply of concentrate for decaffeination to any selected tower.

A second header 21 adapted to carry rinse water or regenerating acid is connected to the top portion of each tower by pipes 22 having valves 23 and to the bottom of each tower by pipes 24 having valves 25.

The bottom of each tower 10 is connected by a pipe 26 having a valve 27 to a neutralizing chamber 28. The bottom of each neutralizing chamber 28 is connected by a pipe 29 to the intake side of a pump 30 having an outlet pipe 31 with a valve 32 connected to the top of the next succeding tower and also connected by a branch pipe 33 having a valve 34 to a drain header 35. The top of each tower 10 is also connected to the drain header 35 by a pipe 37 having a valve 38.

Neutralizing agent is supplied to the various neutralizing chambers 28 from supply tank 40 through a header 41 connected by pipes 42 with valves 43 to the neutralizing chambers 28. The pumps 30 are also connected through discharge pipes 44 having valves 45 to a header 46 which carries the decaffeinated concentrate to a receiver 47.

In accordance with the present invention the green coffee beans are first cleaned and roasted in the usual manner. The roasted beans are then cracked but not ground and are extracted with water or steam at about 300° F. to dissolve the soluble constituents of the bean and to form a coffee extract having a concentration of about 20% to 40% solids and a pH of about 5.0 to about 5.2. The solids contain from 3% to 6% caffeine.

This concentrate is supplied to the header 18 at a temperature of 40° F. to 150° F. at pressures between 0 and 50 p.s.i.g. and is fed thereby to the top of a selected tower 10. The extract flows downwardly through the bed 13 in the selected tower into the mixing chamber 28 of that tower. The extract fed to the mixing chamber 28 is decaffeinated to a caffeine content of about 0.1% or to 0.01% or less on the dry solid basis and has a pH value of about 2.0. A neutralizing agent such as a 2% to 4% solution of KOH in water is fed into the mixing chamber 28 in a measured amount to restore the pH value to the range of 5.0 to 5.2. This neutralized, decaffeinated concentrate is then fed by the pump 30 into the header 46 and thence to the receiver 47. From this receiver the concentrate is fed to a spray drying apparatus of known type to be dried into the form of a dry powder which constitutes the final product.

The above operation is continued until the concentrate entering the mixing chamber 28 reaches a caffeine content of about 0.3% whereupon the valve 45 is closed and the valve 32 opened to feed the concentrate to the top of the next tower and the neutralizing agent is adjusted to neutralize the concentrate in the mixing chamber of the first tower to a value of 5.5 to 5.7. The decaffeination then proceeds in the second tower. The decaffeinated concentrate from the second tower is neutralized in the mixing chamber 28 of the second tower to a value of 5.0 to 5.2 and the valve 45 of the second tower is opened to pump the decaffeinated concentrate into the header 46. When no further appreciable decaffeination takes place in the bed 13 of the first tower the valve 20 of the first tower is closed and the corresponding valve of the second tower is opened to bypass the first tower and feed the concentrate directly to the second tower wherein the same sequence is followed.

The first tower is then reactivated by first supplying rinse water through the header 21 and pipe 22 to the top of the first tower. This rinse water may be softened if necessary or may be demineralized to avoid contamination of the resin. The rinse water flows through the mixing chamber 28 and is pumped by the pump into the discharge header 35 through the pipe 33. After rinsing a reactivating acid such as sulfuric acid having a concentration in water of 7% is fed through the header 21 and through the first tower 10 until the absorbed caffeine has been removed from the resin bed 13. This acid is also fed into the discharge header 35 from which it may be recovered for reuse. Of course different headers may be used for the rinse water and the acid if desired. A single header has been shown for convenience. The regenerated resin is now again washed in a downward direction in the same manner as before, followed by one or more washes in the reverse direction which is effected by closing the valve 23 and opening the valve 25 of the first tower. The first tower is now ready for further use in the decaffeination cycle.

In some instances it may be desirable to use three or even more towers in series in the decaffeination cycle, depending upon the size of the towers, the rate of flow, and the quantity of caffeine to be removed. If more than two towers are used in series the effluent from each tower is neutralized to the desired degree before it is pumped into the next succeeding tower. In this way the concentrate is prevented from remaining for any extended period of time at a low pH value and the original taste is maintained in the product.

It has been found that at least one reverse flow rinse is desirable in order to prevent the bed from packing and to maintain the bed in the most efficient condition for repeated use.

Suitable flow meters and pH gauges to open and close the selected valves automatically at the proper times for putting the desired towers into the decaffeination cycle or through the reactivating cycle as the case may be. After the process has been standardized the valves can be actuated at suitable timed intervals for the above purpose or may be actuated after predetermined quantities of liquid flow in the various pipes.

As a further specific example, the following operating procedures were used in a pilot plant having columns 10″ I.D. and 12′ 2″ inside height, each column containing 4 cubic feet of resin. The resin is placed in the acid cycle on regeneration and the excess acid is displaced and rinsed away with water. Back washing serves to reset the resin particles and the column is ready for operation with coffee extract. Sixty-four gallons of extract are fed into the column at a metered rate of 6 to 15 g.p.h. The following portions of extract are drawn out and held separate

| | Gallons |
|---|---|
| Portion $T_1$ | 14 |
| Portion $T_2$ | 14 |
| Portion $T_3$ | 36 |

$T_1$ will be completely decaffeinated extract and this portion will be restored to the original extract pH of 5.0 to 5.2 by means of KOH solution. The other two portions will have reduced caffeine and lowered pH. Their pH will be adjusted to 5.5 to 5.7. $T_2$ was fed to the second column which was previously regenerated and rinsed. $T_3$ enters this column after $T_2$ and finally 14 gallons of fresh extract is brought in, making a total of 64 gallons fed to column 2. The effluent from the bottom of this column is separated into three portions and the above procedure repeated. The process continues on this basis. The extract flows from top to bottom through the resin bed and the third and final portion of extract entering each column is fresh, untreated coffee extract.

After the fresh extract portion is fed to the column, softened water is fed in to displace the extract. An alkaline wash is then started with 50 gallons passing downflow at 5 to 10 g.p.h. followed by a water rinse. Regeneration is then carried out with 37.5 gallons acid solution which flows downwardly at the same rate. Also, at the same flow rate three more water rinses are carried out.

| | |
|---|---|
| 1st | 60 gallons backflow |
| 2nd | 3 gallons downflow |
| 3rd | 3 gallons backflow |

It is to be understood that various changes and modifications can be made in the above procedure as will be apparent to a person skilled in the art.

What is claimed is:

1. The method of making decaffeinated, instant coffee which comprises passing a coffee concentrate over a bed of an ion exchange resin of the cation exchange type used in the hydrogen cycle which is capable of preferentially absorbing caffeine until the caffeine content of the concentrate has been reduced to the order of about 0.1 percent with a reduction in the pH value of the concentrate, immediately raising the pH of the concentrate to a value of about 5.0 to 5.2 by the addition of an agent selected from the group consisting of sodium hydroxide, potassium hydroxide, sodium carbonate, potassium carbonate, sodium phosphate and potassium phosphate so as to prevent the development of an off-taste, and spray drying the decaffeinated concentrate to form a decaffeinated powder which is soluble in water.

2. The method set forth in claim 1 in which the ion exchange resin is selected from the group consisting of polystyrene sulfonic acid resins, carboxylic acid resins and polystyrene quaternary amine resins.

3. The method set forth in claim 1 in which the ion exchange resin comprises polystyrene sulfonic acid resin used in the hydrogen cycle.

4. The method set forth in claim 1 in which the agent is potassium hydroxide.

5. The method set forth in claim 1 in which a plurality of beds of said ion exchange resin are used in series with progressive reduction in the caffeine content and the pH of the concentrate is raised to said value by the addition of said agent after passing through each bed.

References Cited in the file of this patent

UNITED STATES PATENTS

| 2,509,051 | Appelzweig | May 23, 1950 |
| 2,933,395 | Adler et al. | Apr. 19, 1960 |

OTHER REFERENCES

"Ion-Exchange Resins in the Separation of Caffeine from Maté," E. G. Arruras, "Rev. Fac. Cienc. Quim. Univ. Nacl. La Plata," 24, pp. 53–61 (1952), abstracted in Chem. Abstracts, vol. 47 (1953), page 1865, abstract relied on. (Copy in Sci. Lib.)

"Ion Exchangers in Organic & Biochemistry," 1957, Calmon et al., Interscience Publishers, Inc. (New York), pages 483–536. (Copy in Sci. Lib.)